United States Patent
Yamada et al.

(10) Patent No.: US 9,434,242 B2
(45) Date of Patent: Sep. 6, 2016

(54) DOOR TRIM ASSEMBLY

(71) Applicant: TOYOTA BOSHOKU KABUSHIKI KAISHA, Aichi-ken (JP)

(72) Inventors: Kazuki Yamada, Aichi-ken (JP); Yohei Migaki, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/751,650

(22) Filed: Jun. 26, 2015

(65) Prior Publication Data

US 2016/0001646 A1  Jan. 7, 2016

(30) Foreign Application Priority Data

Jul. 3, 2014  (JP) ................................. 2014-137807

(51) Int. Cl.
  *B60R 13/02* (2006.01)
  *B60R 13/06* (2006.01)
  *B60J 5/04* (2006.01)

(52) U.S. Cl.
  CPC ............... *B60J 5/0418* (2013.01); *B60J 10/75* (2016.02); *B60R 13/0243* (2013.01)

(58) Field of Classification Search
  CPC ...... B60J 10/75; B60J 10/081; B60J 5/0418; B60R 13/0243
  USPC ........................................... 296/146.7, 146.2
  See application file for complete search history.

(56) References Cited

U.S. PATENT DOCUMENTS

| | | | | |
|---|---|---|---|---|
| 6,966,601 | B2* | 11/2005 | Matsumoto | B60R 13/0206 296/146.2 |
| 7,159,926 | B2* | 1/2007 | Ward | B60R 13/0206 296/1.08 |
| 7,536,830 | B2* | 5/2009 | Clark | B60J 10/32 296/146.7 |
| 9,027,982 | B2* | 5/2015 | Ide | B60J 5/0402 296/146.2 |
| 2006/0043764 | A1* | 3/2006 | Schroder | B60J 5/0416 296/146.7 |
| 2011/0215612 | A1* | 9/2011 | Maertin | B60J 10/75 296/146.7 |
| 2013/0320705 | A1* | 12/2013 | Okada | B60J 10/0091 296/146.2 |

FOREIGN PATENT DOCUMENTS

| | | | |
|---|---|---|---|
| JP | 2002-240559 | * | 8/2002 |
| JP | 2012-81912 | | 4/2012 |

\* cited by examiner

*Primary Examiner* — Dennis H Pedder
(74) *Attorney, Agent, or Firm* — Greenblum & Bernstein, P.L.C.

(57) ABSTRACT

A door trim assembly includes a weather strip and a door trim. The door trim includes a holder plate portion arranged opposite the weather strip, an upper holder portion and a lower holder portion projecting from the holder plate portion toward the weather strip, and a support portion. The lower holder portion has a lower holder basal portion continuing from the holder plate portion, and has a gap distance from the upper holder portion. The lower holder portion and the upper holder portion hold a stopper portion of the weather strip therebetween. The support portion is provided near a portion of the holder plate portion where the lower holder basal portion of the lower holder portion continues, and is elastically deformable so that the lower holder portion is moved downwardly to increase the gap distance according to insertion of the stopper portion into a space formed by the gap distance.

15 Claims, 12 Drawing Sheets

DOOR TRIM ASSEMBLY

CROSS REFERENCE TO RELATED APPLICATION

This application claims priority from Japanese Patent Application No. 2014-137807 filed Jul. 3, 2014. The entire contents of the priority application are incorporated herein by reference.

FIELD OF THE INVENTION

The present disclosure relates to a door trim assembly.

BACKGROUND OF THE INVENTION

A vehicular door includes a door trim on a vehicular interior side thereof and the door trim constitutes a vehicular interior design surface. The door trim is mounted on a body panel (a door panel) included in the vehicular door to cover an interior side of the body panel.

A weather strip is mounted on an upper end portion of the body panel. The weather strip seals a space between the door trim and a window glass included in the vehicular door. Such a door trim is configured to be mounted on the weather strip when the door trim is mounted on the body panel.

There has been a weather strip including a mount lip that extends in a vehicular front-rear direction and projects toward the door trim. The door trim includes a pair of holding portions (an upper holder and a lower holder) on a rear surface side thereof. The pair of holding portions projects toward the body panel and holds the mount lip therebetween.

The door trim includes a plurality of holding portions that are arranged in the vehicular front-rear direction with distances therebetween.

The pair of holding portions has a gap therebetween and the pair of holding portions holds the mount lip therebetween when the mount lip is inserted into a space formed by the gap Accordingly, the door trim is mounted on the weather strip. When the mount lip is inserted into the space, the pair of holding portions is elastically deformed to increase the gap at distal ends thereof.

SUMMARY OF THE INVENTION

An objective of the present technology is to provide a door trim assembly including a door trim and a weather strip where the door trim is easily mounted on the weather strip that is attached to a body panel when the door trim is mounted on the body panel.

According to the present technology, a door trim assembly for a vehicle includes a weather strip to be mounted on a body panel of the vehicle and a door trim mounted on the weather strip. The weather strip includes a mount portion to be mounted on the body panel, and a stopper portion projecting from the mount portion toward a vehicular interior side. The door trim includes a holder plate portion arranged on the vehicular interior side with respect to the weather strip and the body panel to be opposite the weather strip and extending in a vehicular front-rear direction, an upper holder portion projecting from the holder plate portion toward the weather strip, a lower holder portion projecting from the holder plate portion toward the weather strip and having a lower holder basal portion and a lower holder distal end portion, the lower holder basal portion continuing from the holder plate portion, and the lower holder portion having a gap distance from the upper holder portion, the lower holder portion and the upper holder portion holding the stopper portion of the weather strip therebetween, and a support portion provided near a portion of the holder plate portion where the lower holder basal portion of the lower holder portion continues, the support portion being elastically deformable so that the lower holder portion is moved downwardly to increase the gap distance according to insertion of the stopper portion into a space formed by the gap distance.

DETAILED DESCRIPTION OF EMBODIMENTS

A vehicular door may not have a large space between the door trim and the body panel due to various reasons such as design. In such a configuration, a projecting length of the holding portions is necessarily decreased and the holding portions are less likely to be elastically deformed when the mount lip is inserted in the space formed by the gap. Therefore, a great force (an insertion force) is required to insert the mount lip into the space between the holding portions and the door trim is not mounted on the weather strip easily and smoothly.

The holding portions may be decreased in thickness so as to be elastically deformed easily when the mount lip is inserted in the space. However, this lowers strength of the holding portions and the holding portions may be broken.

First Embodiment

A first embodiment of the present technology will be described with reference to FIGS. 1 to 7. According to this embodiment, a door trim assembly 1 included in a vehicular door 10 will be described.

Figure 2:
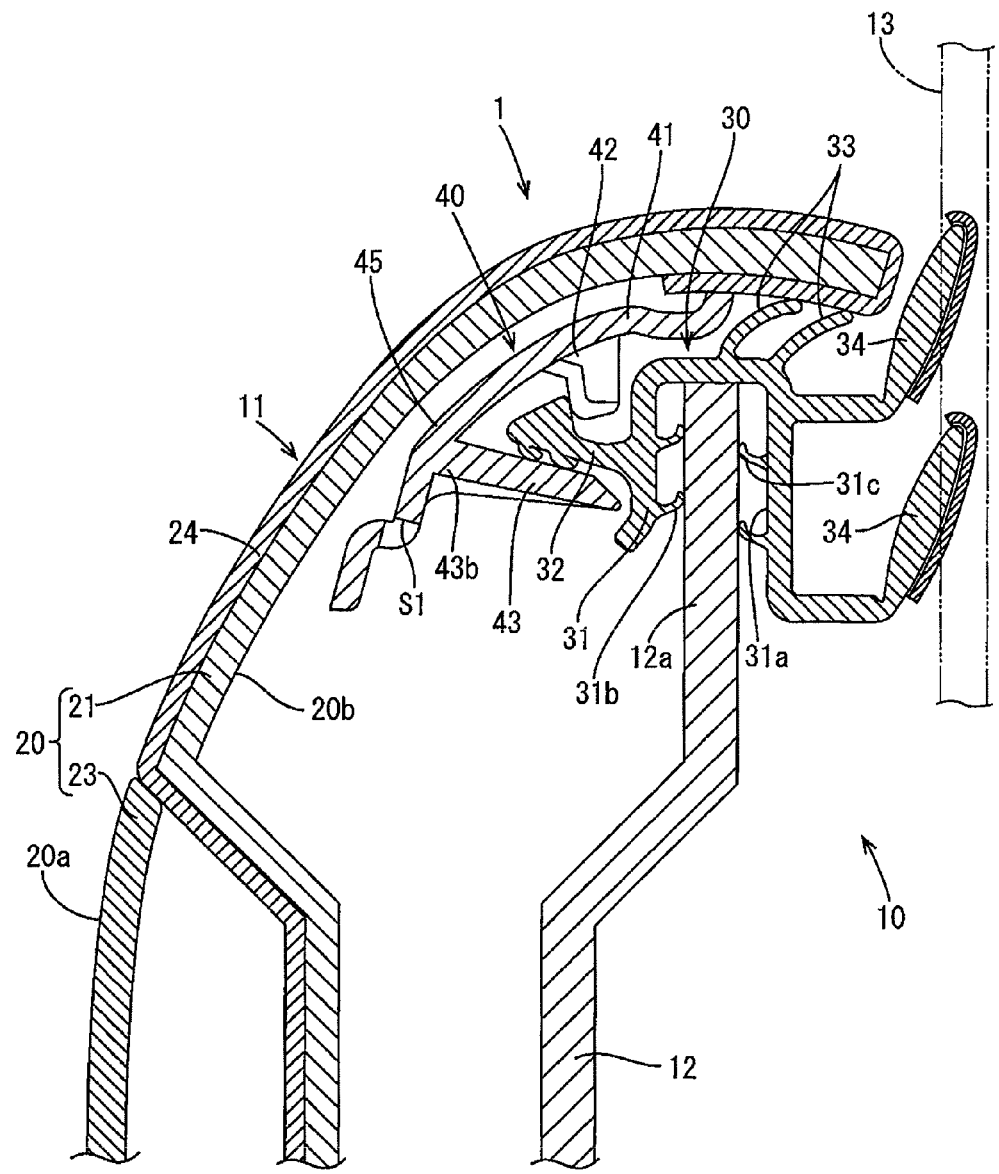
FIG. 2 is a vertical cross-sectional view of the door trim assembly including the door trim and a vehicular door taken along a vehicular width dimension.

The vehicular door 10 is a side door arranged on a side of a vehicular seat (a rear seat). As illustrated in FIG. 2, the vehicular door 10 includes a door inner panel 12 and a door outer panel (not illustrated) that are made of metal and constitute a body panel. The body panel such as the door inner panel 12 constitutes a wall of a vehicular room. The vehicular door 10 further includes a window glass 13 that is moved up and down by a window regulator (not illustrated).

A door trim 11 is mounted on a vehicular interior side with respect to the door inner panel (the body panel) 12 via a clip (not illustrated) that has a projection shape. Such a door trim 11 includes a trim board (a trim main body) 20 that has a plate-like shape and covers the door inner panel 12 from the vehicular interior side. The trim board 20 is made of synthetic resin material or a mixture of synthetic resin material and a natural fiber such as kenaf and is obtained by molding the material into a plate-like shape with a certain die. As illustrated in FIG. 2, the trim board 20 is arranged opposite the door inner panel 12 and on the vehicular interior side with respect to the door inner panel 12.

The trim board 20 includes multiple components. Specifically, the trim board 20 includes an upper board 21 that constitutes an upper portion of the trim board 20, a lower board 22 that constitutes a lower part of the trim board 20, and an ornament board 23 that constitutes a portion of the trim board 20 between the upper board 21 and the lower board 22. A skin may be provided on a part of or an entire area of a vehicular interior surface (a design surface) of the trim board 20. In this embodiment, a skin 24 is attached to a surface of the upper board 21.

Figure 1:
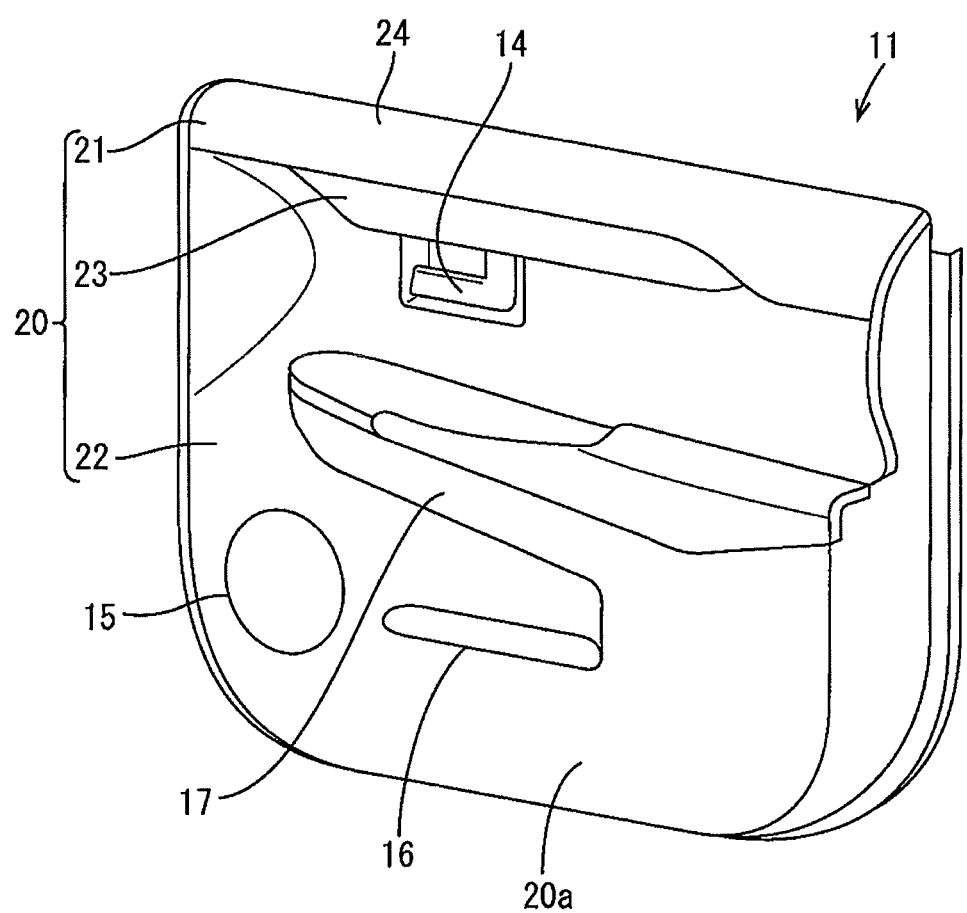
FIG. 1 is a vehicular interior side plan view illustrating a door trim included in a door trim assembly according to a first embodiment of the present technology.

As illustrated in FIG. 1, the trim board 20 includes an armrest 17 on a design surface 20a side (the vehicular interior side) thereof and the armrest 17 projects toward the vehicular interior side. The trim board 20 further includes an inside door handle 14, a speaker grill 15, and a door pocket 16, for example. The trim board 20 does not necessarily include the multiple components but may be constituted by one component.

As illustrated in FIG. 2, the vehicular door 10 includes a weather strip 30. The weather strip 30 as a whole has an elongated shape extending in a vehicular front-rear direction and is made of an elastic material such as rubber. The weather strip 30 includes a mount portion 31 and a stopper portion 32. The mount portion 31 is mounted on an upper end portion 12a of the door inner panel 12. The stopper portion 32 projects from the mount portion 31 toward the vehicular interior side (toward the door trim 11).

The trim board 20 is mounted on the door inner panel 12 where the weather strip 30 is mounted. The trim board 20 is mounted on the door inner panel 12 from the vehicular interior side to be opposed to the weather strip 30. As will be described later, the trim board 20 is also mounted on the weather strip 30.

The mount portion 31 is mounted on the upper end portion 12a of the door inner panel 12 and has an elongated shape extending the vehicular front-rear direction as a whole. The mount portion 31 is configured to cover and sandwich the upper end portion 12a of the door inner panel 12 from the vehicular interior and exterior sides. As illustrated in FIG. 2, such a mount portion 31 has a U-shaped cross section that opens downward.

The mount portion 31 has a groove 31a extending in an elongated direction thereof and the groove 31a includes a vehicular interior side wall and a vehicular exterior side wall. The upper end portion 12a of the door inner panel 12 is inserted in the groove 31a. The mount portion 31 further includes contact portions 31b that project from an inner surface of the vehicular interior side wall of the groove 31a and contact portions 31c that project from an inner surface of the vehicular exterior side wall. The contact portions 31b are opposite the contact portions 31c. When the upper end portion 12a is inserted in the groove 31a, the contact portions 31b, 31c hold the upper end portion 12a of the door inner panel 12 from the vehicular interior and exterior sides with respect to the door inner panel 12.

The stopper portion 32 is connected to the upper portion of the door trim 11 (the upper board 21) from a rear surface 20b side. As illustrated in FIG. 2, the stopper portion 32 projects from the vehicular interior side wall of the mount portion 31 toward the vehicular interior side. The stopper portion 32 extends in the vehicular front-rear direction similar to the mount portion 31.

Figure 6:
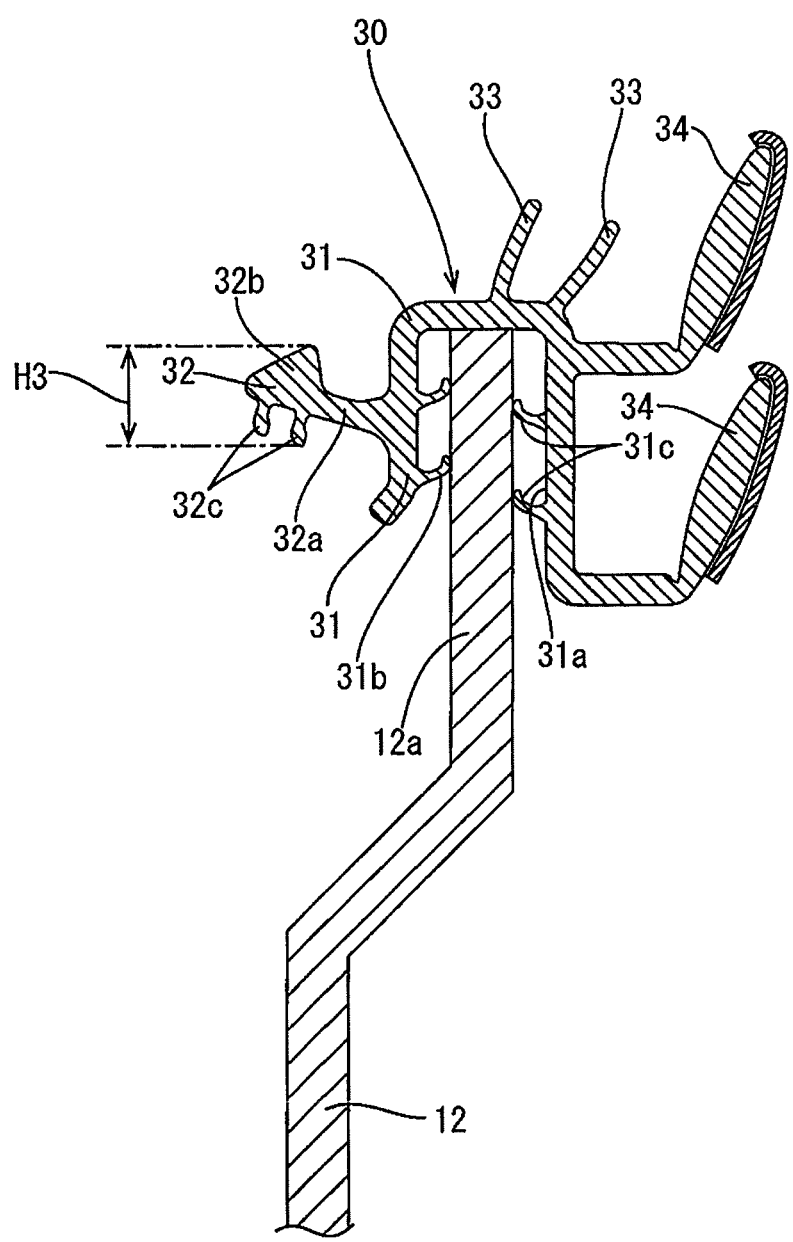
FIG. 6 is a cross-sectional view of a door inner panel where the weather strip is mounted.

As illustrated in FIG. 6, the stopper portion 32 includes an extended portion 32a and a stopper end portion 32b. The extended portion 32a extends from the mount portion 31 toward the vehicular interior side and has a certain thickness. The stopper portion 32 includes the stopper end portion 32b at a distal end of the extended portion 32a and the stopper end portion 32b is a projection that projects upward from the extended portion 32a. The extended portion 32a extends in the elongated direction of the mount portion 31 (the vehicular front-rear direction). The stopper end portion 32b extends in the elongated direction of the mount portion 31 similar to the extended portion 32a. The extended portion 32a has projections 32c on a lower surface of the distal end portion thereof. The projections 32c project downward and extend in the elongated direction of the mount portion 31.

The weather strip 30 further includes small lips 33 and large lips 34. The small lips 33 project from an upper wall of the mount portion 31 upward and are adhered to the rear surface 20b side of the upper board 21. The large lips 34 project from the vehicular exterior side wall of the mount portion 31 toward the vehicular exterior side and are adhered to the window glass 13. The lips 33, 34 are elastically deformable and configured to seal a space between the trim board 20 and the door inner panel 12 and a space between the window glass 13 and the door inner panel 12, respectively.

Next, the mounting configuration of the door trim assembly 1 will be described. In the mounting configuration, the door trim 11 (the trim board 20) is mounted on the weather strip 30 that is mounted on the door inner panel 12.

The door trim 11 includes a holder 40 that holds the weather strip 30. The holder 40 is fixed to a rear surface side with respect to the trim board 20 (the upper board 21) and has a shape following the vehicular exterior side surface (the rear surface) of the trim board 20. The holder 40 is a separate component from the trim board 20. The holder 40 is made of material same as that of the trim board 20 (such as synthetic resin) and has an elongated shape extending in the vehicular front-rear direction as a whole.

The holder 40 includes a holder plate portion 41, a plurality of upper holder portions 42, and a plurality of lower holder portions 43. The holder plate portion 41 has a plate-like shape and is fixed to the rear surface 20b of the upper board 21 with the known fixing means such as screws. The upper holder portions 42 project from the holder plate portion 41 toward the vehicular exterior side (namely, toward the weather strip 30). The lower holder portions 43 project from the holder plate portion 41 toward the vehicular exterior side.

Figure 4:
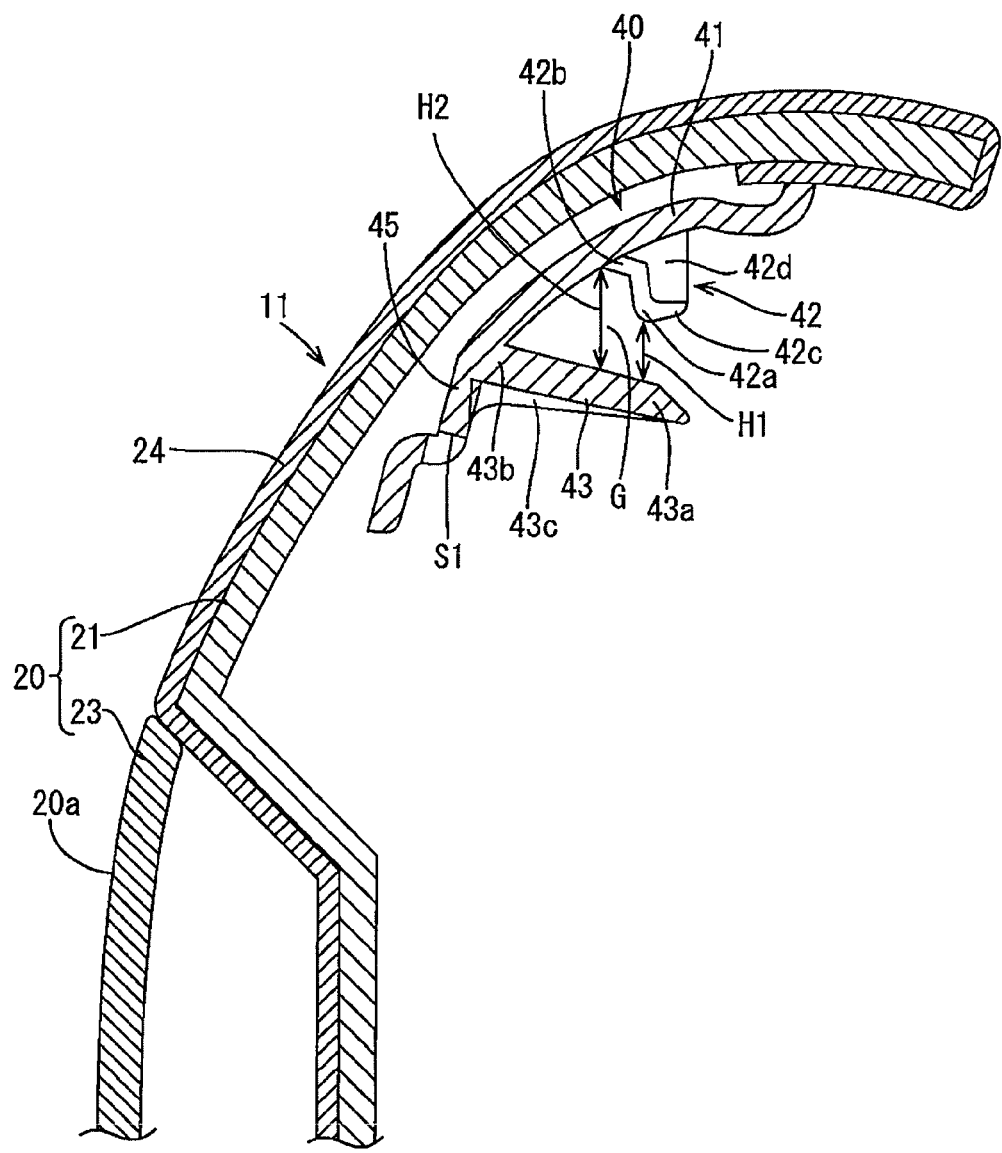
FIG. 4 is a cross-sectional view of the upper board taken along line A-A in FIG. 3.

As illustrated in FIGS. 2 and 4, the holder 40 is arranged on the rear surface 20b side of the upper board 21 and is not seen from the design surface 20a side. A part of the holder 40 is fixed to the upper board 21 so that a portion of the holder 40 having the upper holder portions 42 and the lower holder portions 43 is spaced from the rear surface 20b. According to this configuration, support portions 45 (will be described later) where the lower holder portions 43 are provided are not seen from the design surface 20a side and a space is provided so that the support portions 45 elastically deform in a vehicular width direction (especially toward the vehicular interior side).

Figure 3:
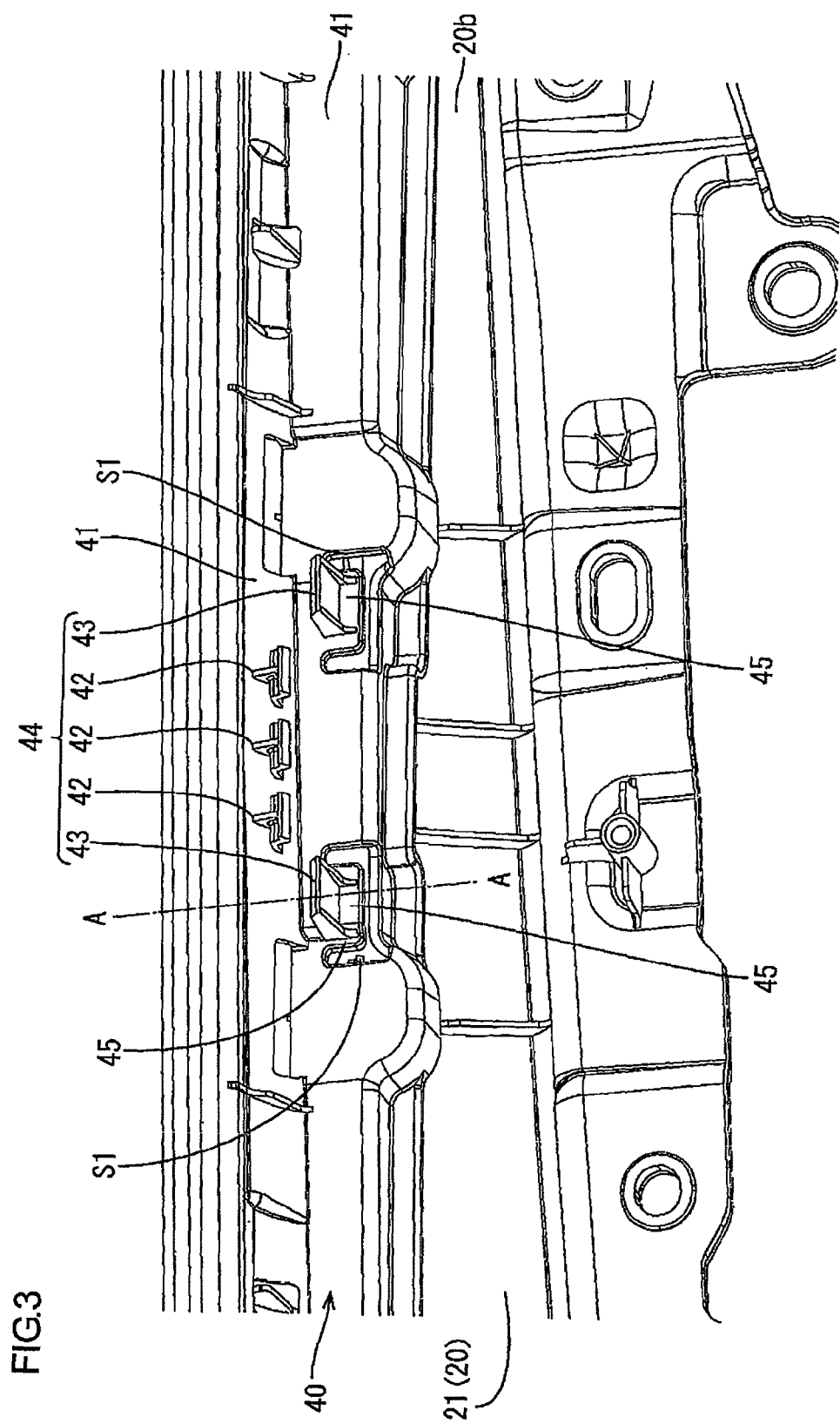
FIG. 3 is a perspective view illustrating an upper portion of the door trim (an upper board) seen from a vehicular exterior side.

As illustrated in FIG. 3, the upper holder portions 42 are arranged in the elongated direction of the holder 40, that is in the vehicular front-rear direction. The lower holder portions 43 are arranged in the elongated direction of the holder 40. In this embodiment, as illustrated in FIG. 3, three upper holder portions 42 are arranged between two lower holder portions 43 that are arranged in the vehicular front-rear direction with a certain distance therebetween. The upper holder portions 42 and the lower holder portions 43 have a gap (a gap distance) therebetween and a space G is formed by the gap so that the stopper portion 32 of the weather strip 30 is inserted therein, as illustrated in FIG. 4.

A combination of the upper holder portions 42 and the lower holder portions 43 illustrated in FIG. 3 is an example of a holding member 44 that sandwiches the stopper portion 32 of the weather strip 30 from upper and lower sides and holds it. The holder 40 includes multiple holding members 44 that are provided in the vehicular front-rear direction at certain intervals.

The upper holder portions 42 are above the stopper portion 32 and hold (are in contact with) the stopper portion 32 from the above when the door trim 11 is mounted on the door inner panel 12. The lower holder portions 43 are under the stopper portion 32 and support (are in contact with) the stopper portion 32 from the below when the door trim 11 is mounted on the door inner panel 12.

The space G is formed by the gap between the lower holder portions 43 and the upper holder portions 42 as described above, and the lower holder portions 43 and the upper holder portions 42 hold the stopper portion 32 therebetween when the stopper portion 32 is inserted in the space G As illustrated in FIG. 4, each of the upper holder portions 42 has a length by which the upper holder portion 42 projects from the holder plate portion 41 and the length of the upper holder portions 42 is smaller than that of the lower holder portions 43. Each upper holder portion 42 includes an upper main body 42c and a reinforcing portion 42d. The upper main body 42c has a curved plate-like shape and extends from the holder plate portion 41 downwardly. The upper main body 42c has a distal end portion 42a that extends downwardly from a basal end portion 42b. The reinforcing portion 42d has a plate-like shape and is provided between the upper main body 42c and the holder plate portion 41 to support the upper main body 42c. The upper holder portions 42 having such a configuration have strength greater than that of the lower holder portions 43 and are less likely to be elastically deformed when the stopper portion 32 is inserted in the space G The upper holder portions 42 have strength so as not to be damaged or broken when a person applies a load to an upper portion of the door trim 11 that is mounted on the body panel.

Figure 5:
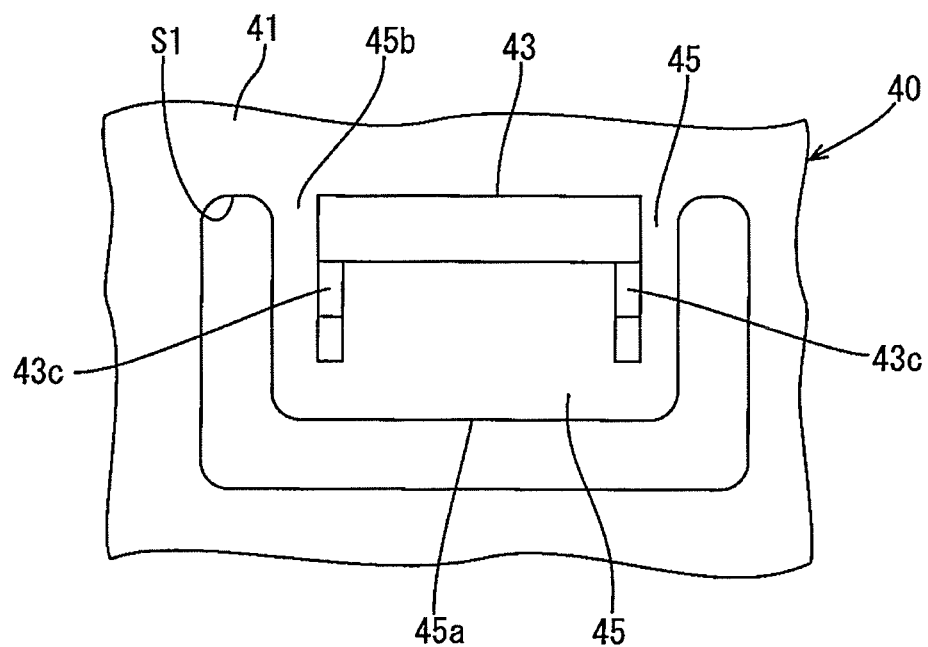
FIG. 5 is a vehicular exterior side plan view of a lower holder portion.

Each of the lower holder portions 43 has a length by which the lower holder portion 43 projects from the holder plate portion 41 and the length of the lower holder portions 43 is greater than that of the upper holder portions 42. The lower holder portion 43 has a plate-like shape that extends straight from a basal end portion 43b to a distal end portion 43a thereof. The lower holder portion 43 includes reinforcing portions 43c at two edges thereof with respect to the vehicular front-rear direction so as not to be deformed. The reinforcing portions 43c extend downwardly from the two edges of the lower holder portion 43. As illustrated in FIGS. 3 and 5, slits SI are formed in a part of the holder 40 and are substantially U-shaped slits each surrounding the basal end portion 43b and basal end portion of the reinforcing portion 43c. Specifically, the slits Si are formed in the holder plate portion 41 and the holder plate portion 41 of the holder 40 includes the support portions 45 on an inner side with respect to each of the slits Si having the U-shape. As illustrated in FIG. 5, each of the slits S1 includes a bottom slit portion and two side slit portions and the support portion 45 is surrounded by the bottom slit portion and the two slit portions. The lower holder portion 43 is arranged above the bottom slit portion and is arranged on the support portion 45.

As illustrated in FIG. 5, the support portion 45 has a rectangular plate-like shape and is continuous from the holder plate portion 41. The support portion 45 includes a basal end portion 45b close to the basal end portion 43b and a distal end portion 45a. The support portion 45 is deformed and pivots about the basal end portion 45b so that the distal end portion 45a is moved toward a vehicular interior side when the stopper portion 32 of the weather strip 30 is inserted in the space G. Accordingly, the lower holder portions 43 each pivot about the basal end portion 43b so that the distal end portions 43a are moved downwardly to increase a distance between the upper holder portions 42 and the lower holder portions 43 and enlarge the space G The support portion 45 elastically recovers its original shape that is a shape before the stopper portion 32 is inserted in the space G.

Next, with reference to FIGS. 4 to 7, configurations of the components during the insertion of the stopper portion 32 into the space G will be described and also a process of mounting the door trim 11 on the weather strip 30 will be described.

Figure 7:
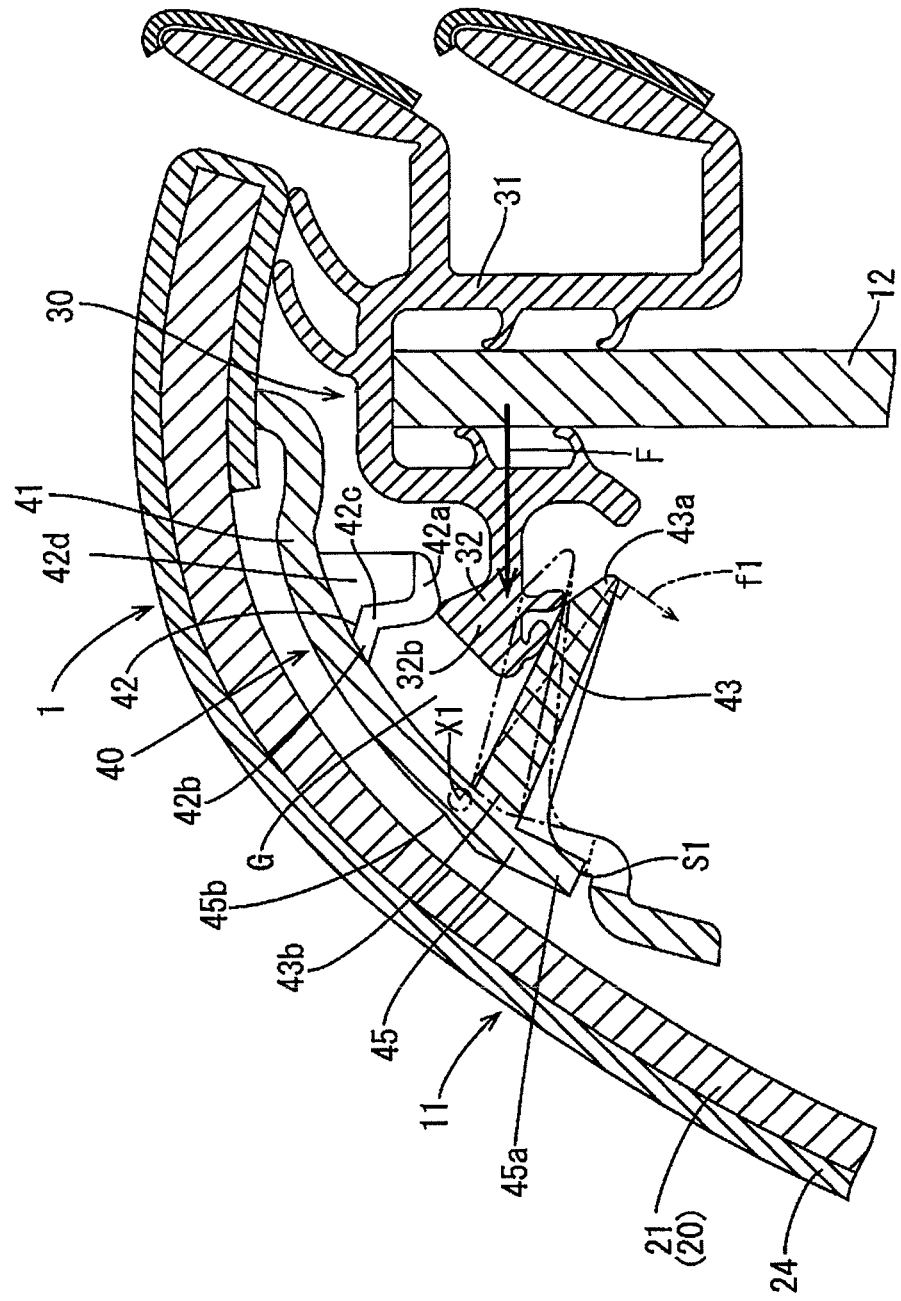
FIG. 7 is a cross-sectional view of the door trim assembly where a stopper portion is inserted into a space formed by a gap between upper holder portions and lower holder portions.

As illustrated in FIG. 6, the weather strip 30 is mounted on the upper end portion 12a of the door inner panel 12. When the trim board 20 of the door trim 11 is mounted on the door inner panel 12 from the vehicular interior side as illustrated in FIG. 7, the upper board 21 of the trim board 20 is moved closer to the weather strip 30. Then, the stopper portion 32 of the weather strip 30 is inserted into the space G between the upper holder portions 42 and the lower holder portions 43 that are provided on the rear surface 20b side of the upper board 21.

As illustrated in FIG. 4, the distal end portion 42a of each upper holder portion 42 is away from the distal end portion 43a of each lower holder portion 43 by a gap distance H1, and the basal end portion 42b of each upper holder portion 42 is away from each lower holder portion 43 by a gap distance H2. The gap distance H1 is smaller than the gap distance H2. As illustrated in FIG. 6, the stopper end portion 32b of the stopper portion 32 has a dimension H3 that is a largest dimension thereof with respect to an upper-lower direction. The dimension H3 is greater than the gap distance H1.

According to the insertion of the distal end portion (the stopper end portion 32b) of the stopper portion 32 into the space G, the stopper portion 32 is moved into the space G with being held between the upper holder portions 42 and the lower holder portions 43 as illustrated in FIG. 7. As the stopper portion 32 is moved into the space G, the projections 32c that are formed on the lower surface of the stopper portion 32 are moved along the lower holder portion 43 with being elastically deformed.

The support portion 45 surrounded by the slit S1 is capable of pivoting about a rotation axis X1 (a rotation center, a pivot point) that is on the basal end portion 45b of the support portion 45. Each of the support portions 45 is deformable to pivot about the rotation axis X1 toward the vehicular interior side. The rotation axis X1 is above the lower holder portion 43.

As illustrated in FIG. 7, if the stopper portion 32 is inserted relatively into the space G toward the holder plate portion 41, the lower holder portions 43 receive force f1 from the stopper portion 32. Then, each of the lower holder portions 43 receiving the force f1 pivots about the rotation axis X1 and the distal end portions 43a move downward. According to the pivoting of the lower holder portions 43, each of the support portions 45 is deformed to pivot about the rotation axis X1 toward the vehicular interior side. Thus, the lower holder portions 43 are pressed by the stopper portion 32 so that the support portions 45 are elastically deformed and the distal end portions 45a move toward the vehicular interior side. As a result, the gap distances H1, H2 are increased and the space G is enlarged and therefore, the stopper portion 32 is easily inserted into the space G After the stopper end portion 32b of the stopper portion 32 passes through the gap having the gap distance 111 near the distal end portion 42a of the upper main body 42c, the support portion 45 recovers its original shape due to the elastic force thereof, that is, the support portion 45 is moved back toward the vehicular exterior side. As a result, the lower holder portions 43 and the upper holder portions 42 hold the stopper portion 32 therebetween to fix it in the space G as illustrated in FIG. 2. Thus, the stopper portion 32 is arranged in the space G so that the door trim 11 is mounted on the weather strip 30.

In the door trim assembly 1 according to this embodiment, when the door trim 11 is mounted on the weather strip 30, the stopper portion 32 is inserted into the space G between the upper holder portions 42 and the lower holder portions 43. According to the insertion of the stopper portion 32 into the space G, the lower holder portions 43 are pressed by the stopper portion 32 and pivot about the rotation axis X1 so that the distal end portions 43a of the lower holder portions 43 are lowered. Also, the support portions 45 supporting the lower holder portions 43 pivot about the corresponding rotation axis X1 that is on the basal end portion 45b of each support portion 45 so that the distal end portions 45a are moved toward the vehicular interior side. The lower holder portions 43 and the support portions 45 are capable of elastically recovering their original shapes. After the pivoting, the lower holder portions 43 are moved away from the upper holder portions 42 to enlarge the space G. Therefore, the stopper portion 32 is easily moved into the space G between the upper holder portions 42 and the lower holder portions 43 and accordingly, the door trim 11 is easily mounted on the weather strip 30.

In the door trim assembly 1 according to this embodiment, the force from the stopper portion 32 is effectively transmitted to the lower holder portions 43 and the stopper portion 32 is less likely to receive resistance when being inserted into the space G A direction of the force f1 necessary for the pivoting of the lower holder portion 43 and that of the force F applied to the stopper portion 32 are toward the vehicular interior side. Therefore, the force is effectively transmitted from the stopper portion 32 to the lower holder portions 43 and the stopper portion 32 is easily inserted into the space G in the door trim assembly of this embodiment.

In this embodiment, if the lower holder portions 43 are less likely to be deformed, the support portions 45 surrounded by the respective slits S1 are easily and effectively deformed. Thus, the space G is enlarged when the stopper portion 32 is inserted into the space G. The door trim assembly 1 of this embodiment is quite useful if a sufficient space is not provided between the door trim 11 and the door inner panel 12.

Second Embodiment

Figure 8:
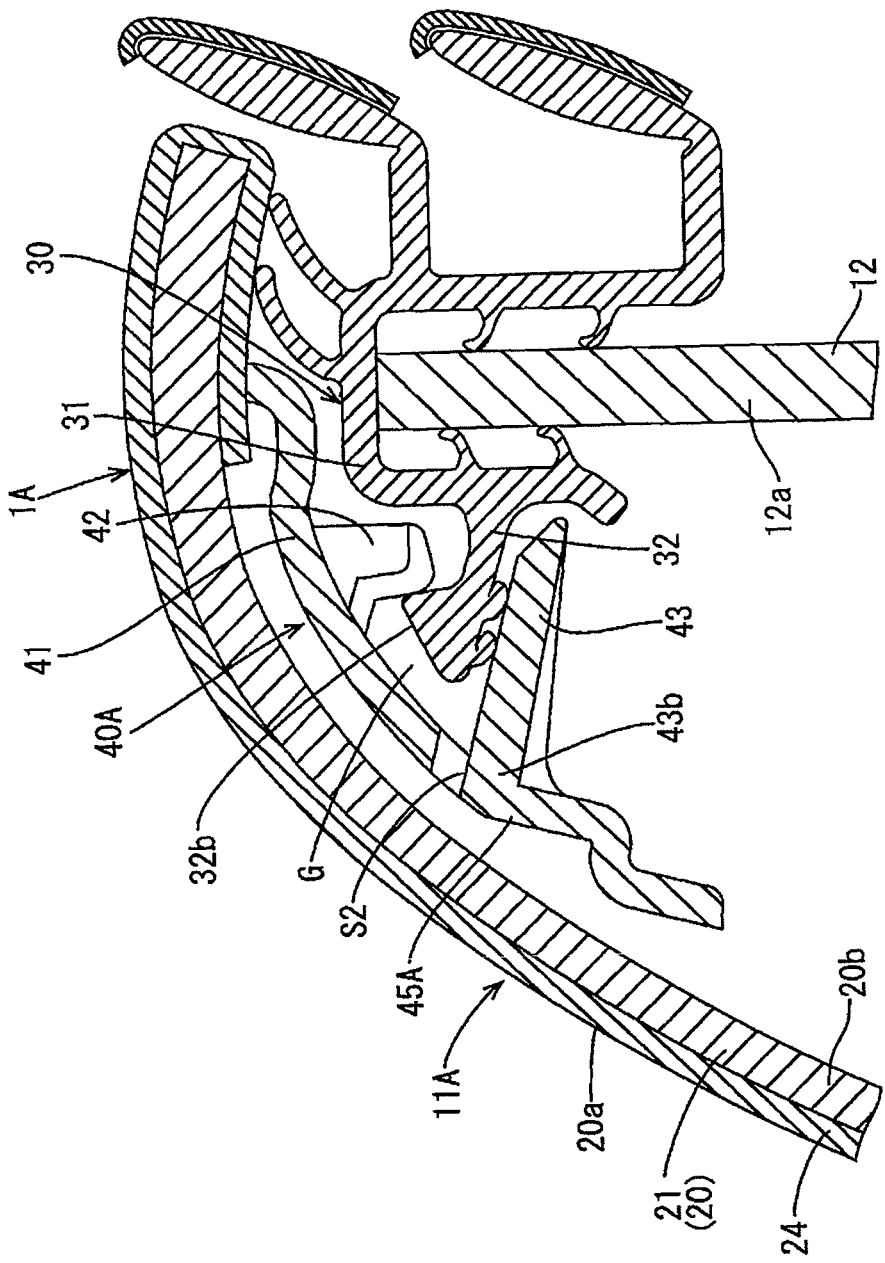
FIG. 8 is a vertical cross-sectional view of a door trim assembly according to a second embodiment taken along the vehicular width dimension.

Next, a second embodiment of this technology will be described with reference to FIGS. 8 to 10. In the following embodiments, configurations same as those in the first embodiment are provided with the same symbols or numerals as those in the first embodiment and will not described in detail.

Figure 9:
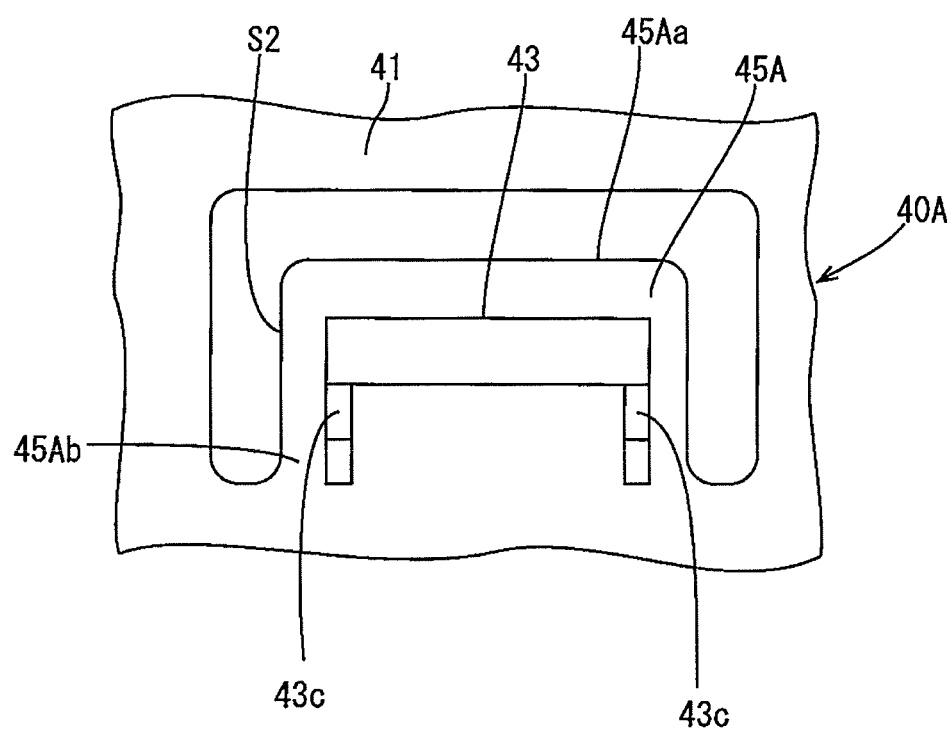
FIG. 9 is a vehicular exterior side plan view of a lower holder portion according to the second embodiment.
Figure 10:
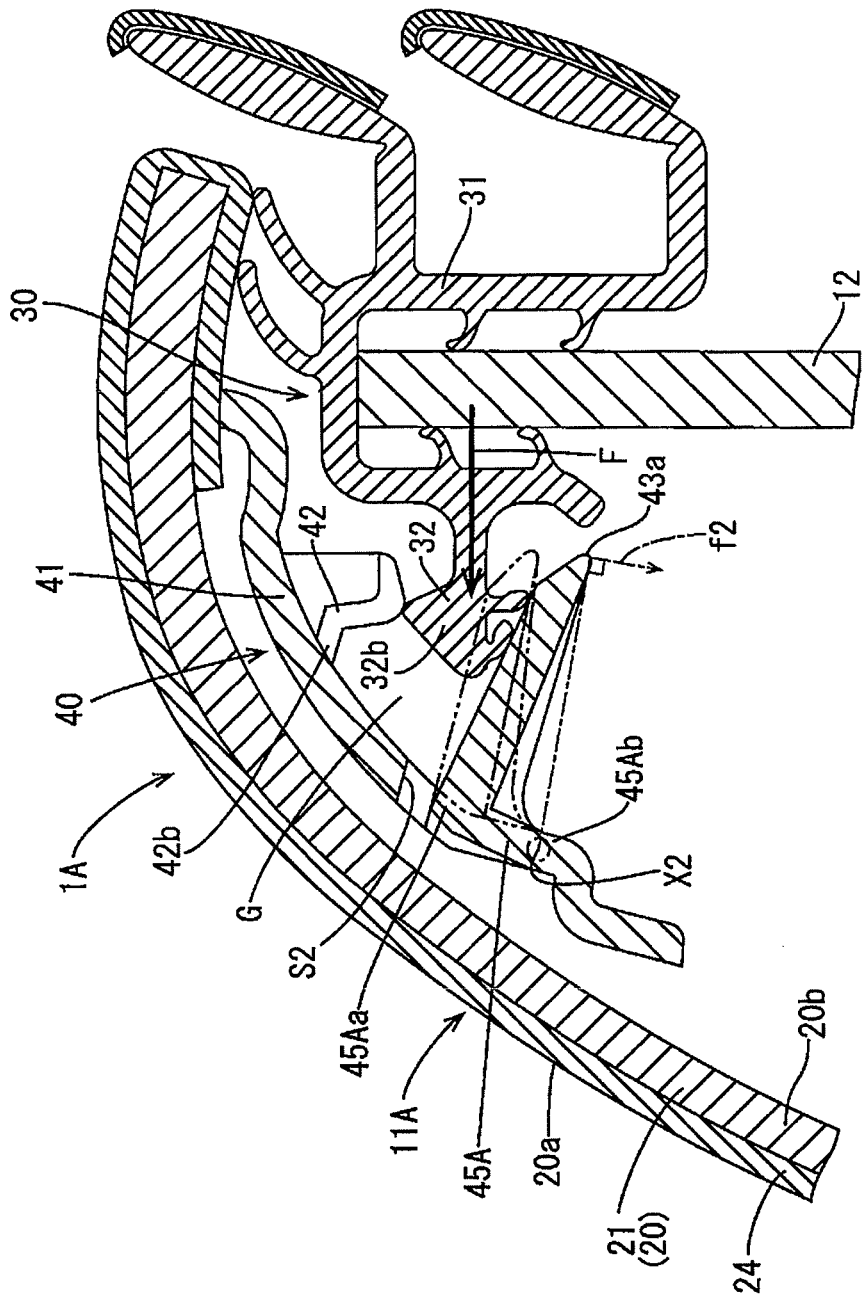
FIG. 10 is a cross-sectional view of the door trim assembly where the stopper portion is inserted into a space formed by a gap between upper holder portions and lower holder portions according to the second embodiment.

A door trim assembly 1A of this embodiment includes a holder 40A having slits S2 that have a substantially U-shape surrounding upper peripheries of the upper holder portions 43, as illustrated in FIG. 9. Namely, each of the slits S2 has an upside-down U-shape. The slit S2 is formed around each of the lower holder portions 43 and the holder 40A includes support portions 45A that are continuously from the holder plate portion 41 upwardly. Specifically, the slits S2 are formed in the holder plate portion 41 and the holder plate portion 41 includes the support portions 45A on an inner side with respect to the respective slits S2 having the U-shape. As illustrated in FIG. 9, each of the slits S2 includes a bottom slit portion and two side slit portions and each of the support portions 45A is surrounded by the bottom slit portion and the two slit portions. The lower holder portions 43 are arranged below the respective bottom slit portions and are arranged on the respective support portions 45A.

As illustrated in FIG. 9, each of the support portions 45A has a rectangular plate-like shape and is continuous from the holder plate portion 41 upwardly. Each of the support portions 45A includes a basal end portion 45Ab and a distal end portion 45Aa. Each of the support portions 45A surrounded by the corresponding slit S2 is capable of pivoting about a rotation axis X2 (a rotation center, a pivot point) that is on the basal end portion 45Ab of each support portion 45A. Each support portion 45A is deformable to pivot about the rotation axis X2 toward the vehicular exterior side and each lower holder portions 43 is capable of moved downwardly with the pivoting of the support portion 45A. The rotation axis X2 is below the lower holder portion 43.

Next, with reference to FIG. 10, configurations of the components during the insertion of the stopper portion 32 into the space G in the door trim assembly 1A of the second embodiment will be described.

If the stopper portion 32 is relatively inserted into the space G and toward the holder plate portion 41, the lower holder portions 43 receive a force f2 from the stopper portion 32. Then, the lower holder portions 43 receiving the force f2 each pivot about the rotation axis X2 so that the distal end portions 43a move downwardly. According to the pivoting of the lower holder portions 43, each support portion 45A is deformed to pivot about the rotation axis X2 toward the vehicular exterior side. Thus, the lower holder portions 43 are pressed by the stopper portion 32 so that the support portions 45A are elastically deformed to pivot about the corresponding rotation axis X2 and the distal end portions 45Aa are moved toward the vehicular exterior side. As a result, the gap distances H1, H2 are increased and the space G is enlarged so that the stopper portion 32 is easily inserted into the space G.

After the stopper end portion 32b of the stopper portion 32 passes through the gap having the gap distance H1 near the distal end portions 42a of each upper main body 42c, the support portions 45A recover their original shapes due to the elastic force thereof, that is, the support portions 45A are moved back toward the vehicular interior side. As a result, the lower holder portions 43 and the upper holder portions 42 hold the stopper portion 32 therebetween to fix it in the space G as illustrated in FIG. 8. Thus, the stopper portion 32 is arranged in the space G so that a door trim 11A is mounted on the weather strip 30.

In the door trim assembly 1A according to this embodiment, when the door trim 11A is mounted on the weather strip 30, the stopper portion 32 is inserted into the space G formed by the gap between the upper holder portions 42 and the lower holder portions 43. According to the insertion of the stopper portion 32 into the space G, the lower holder portions 43 are pressed by the stopper portion 32 and moved downwardly. Accordingly, each support portion 45A supporting the lower holder portion 43 pivots about the rotation axis X2 that is on the basal end portion 45Ab of the support portion 45A so that the support portion 45A is moved toward the vehicular exterior side. The lower holder portions 43 and the support portions 45A are capable of elastically recovering their original shapes. After the pivoting, the lower holder portions 43 are moved away from the upper holder portions 42 to enlarge the space G. Namely, the distal end portions 43a of the lower holder portions 43 are moved downwardly with respect to the basal end portions 43b. Therefore, the stopper portion 32 is easily moved into the space G between the upper holder portions 42 and the lower holder portions 43 and accordingly, the door trim 11A is easily mounted on the weather strip 30.

In this embodiment, if the lower holder portions 43 are less likely to be deformed, the support portions 45A surrounded by the slits S2 are easily and effectively deformed. Thus, the space G is enlarged when the stopper portion 32 is inserted into the space G The door trim assembly 1A of this embodiment is quite useful if a sufficient space is not provided between the door trim 11A and the door inner panel 12.

In this embodiment, the support portions 45A are less likely to be moved toward the vehicular interior side. Therefore, when the door trim 11A is mounted on the weather strip 30, the support portions 45A are less likely to come in contact with components arranged on the vehicular interior side with respect to the support portions 45A such as the upper board 21 or the skin 24. The design surface 20a of the door trim 11A (the trim board 20) is less likely to be damaged.

Third Embodiment

Figure 11:
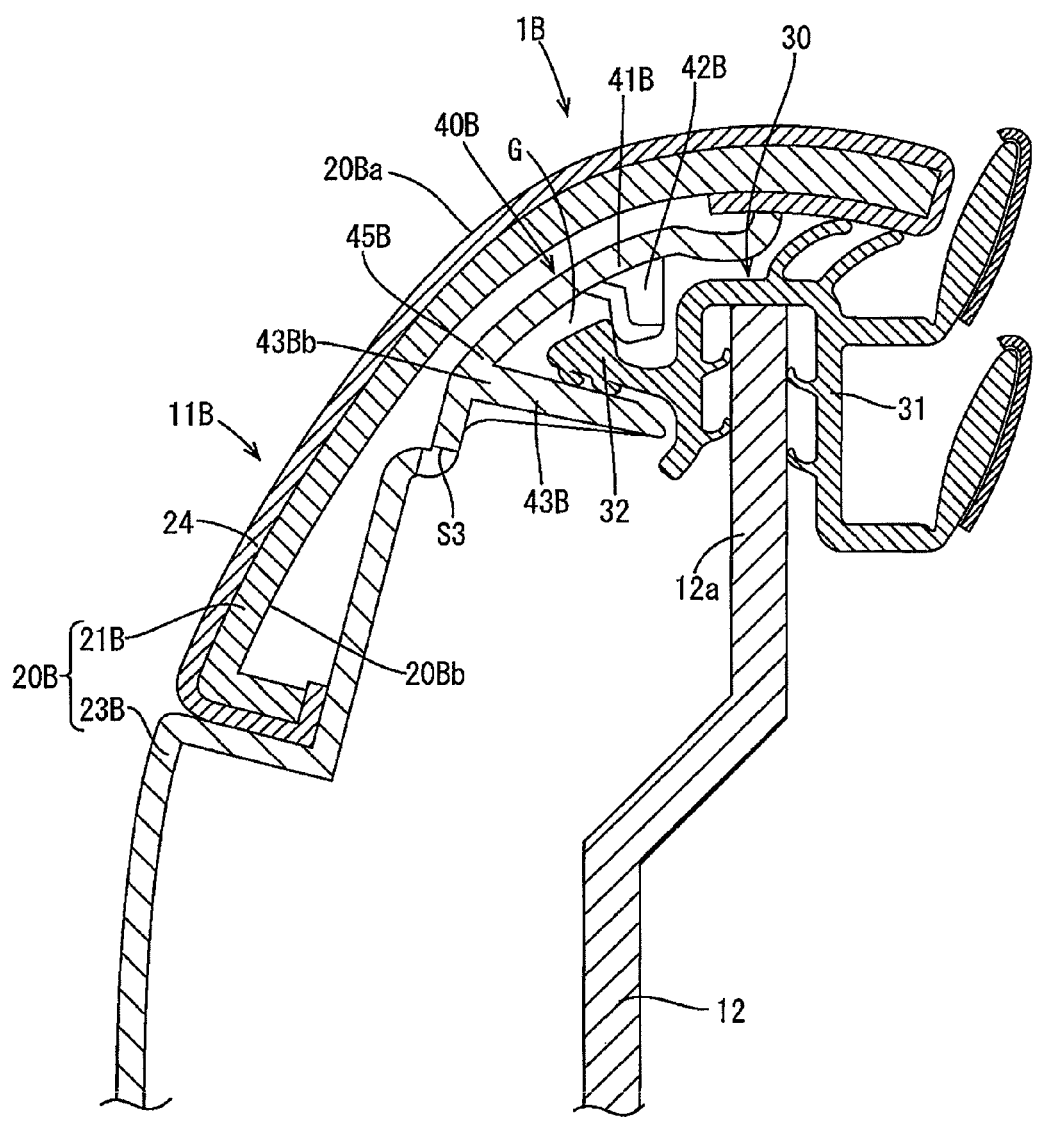
FIG. 11 is a vertical cross-sectional view of a door trim assembly according to a third embodiment taken along the vehicular width dimension.

Next, a third embodiment of the present technology will be described with reference to FIG. 11. According to this embodiment, a door trim assembly 1B differs from that of the first embodiment in a configuration of a trim board 20B included in a door trim 11B. Specifically, the trim board 20B includes an ornament board 23B that integrally includes a holder 40B. Namely, the holder 40B is included as a part of the ornament board 23B. Accordingly, an upper board 21B has a configuration different from that of the upper board 21 in the first embodiment.

In this embodiment, the ornament board 23B further extends upward along a rear surface 20Bb of the upper board 21B and continues to the holder 40B. The holder 40B is provided on the rear surface 20Bb side of the upper board 21B so as to have a space from the rear surface 20Bb of the upper board 21B. The holder 40B includes a holder plate portion 41B, upper holder portions 42B, lower holder portions 43B, and support portions 45B similar to that of the first embodiment. The holder 40B includes slits S3 that have a substantially U-shape along lower peripheries of the lower holder portions 43B similarly to the first embodiment.

In this embodiment, the upper holder portions 42B and the lower holder portions 43B that hold the stopper portion 32 of the weather strip 30 are integrally formed with a component included in the trim board 20B such as the ornament board 23B.

In this embodiment, the holder 40B is configured not to be seen from the design surface 20Ba side and to have a space where the support portions 45B are deformed to be moved to enlarge the space G.

Fourth Embodiment

Figure 12:
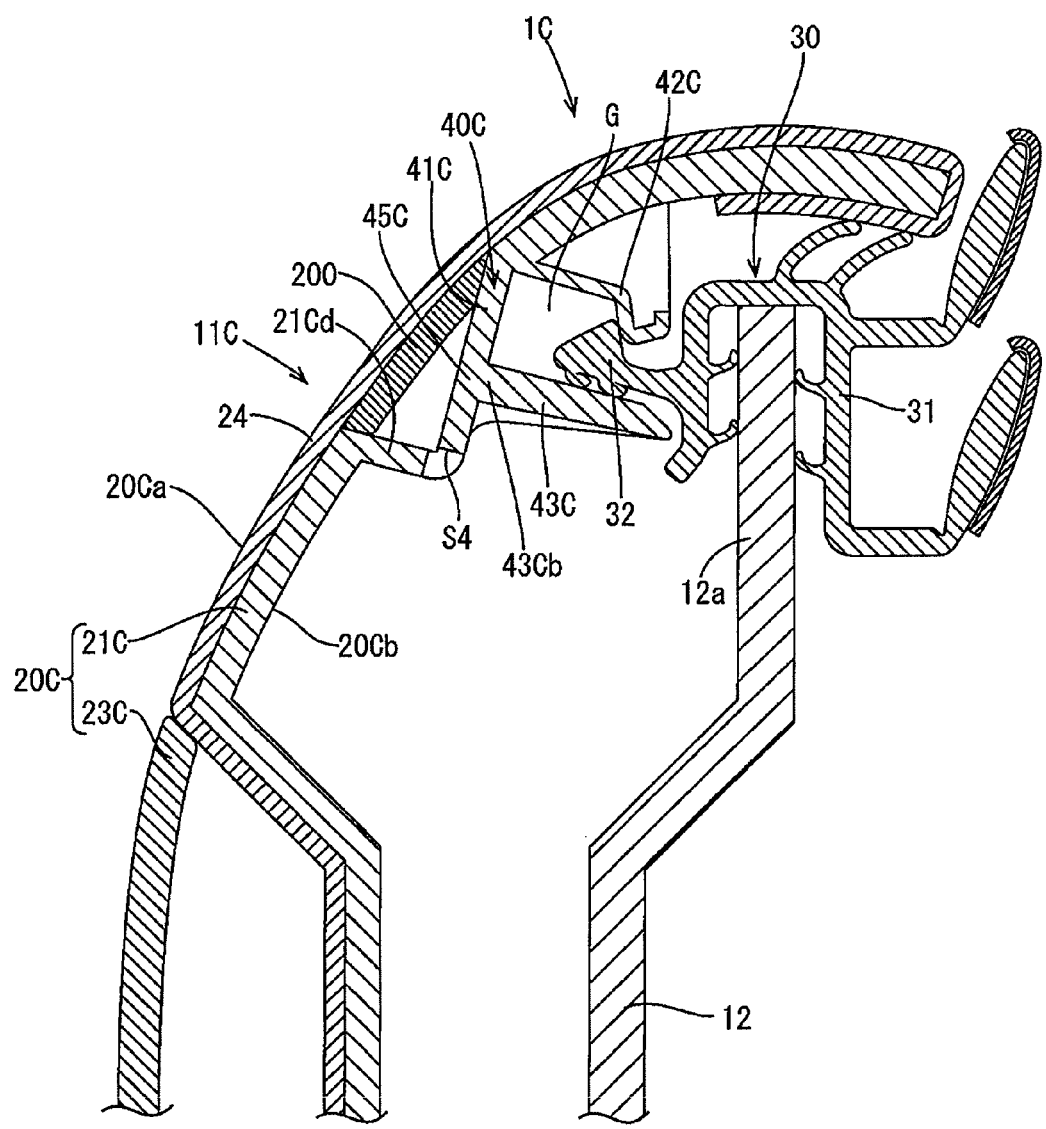
FIG. 12 is a vertical cross-sectional view of a door trim assembly according to a fourth embodiment taken along the vehicular width dimension.

Next, a fourth embodiment of the present technology will be described with reference to FIG. 12. According to this embodiment, a door trim assembly 1C differs from that of the first embodiment in a configuration of a trim board 20C included in a door trim 11C. Specifically, the trim board 20C includes an upper board 21C that integrally includes a holder 40C. Namely, the holder 40C is included as a part of the upper board 21C. An ornament board 23C has a same configuration as that of the first embodiment.

The upper board 21C has a step portion 21Cd in an upper portion thereof and has a recessed portion recessed toward the vehicular exterior side. The upper board 21C includes the holder 40C in the recessed portion. The trim board 20C further includes a support board 200 on the vehicular interior side with respect to the holder 40C to close a space in the recessed portion that is defined by the step portion 21Cd and a holder plate portion 41C of the holder 40B. The support board 200 has an elongated shape extending in the vehicular front-rear direction. The support board 200 is arranged so that vehicular interior side surfaces of the support board 200 and the upper board 21C are continuous and form a smooth curved surface.

The holder 40C includes the holder plate portion 41C, upper holder portions 42C, lower holder portions 43C, and support portions 45C similar to that of the first embodiment. The holder 40C includes slits S4 that have a substantially U-shape along lower peripheries of a basal end portions 43Cb of the lower holder portions 43C similarly to the first embodiment. The holder 40C is configured to have a space between the holder 40C and the support board 200 so that the support portions 45C are deformed toward the vehicular interior side to enlarge the space G.

In this embodiment, the upper holder portions 42C and the lower holder portions 43C that hold the stopper portion 32 of the weather strip 30 are integrally formed with a component included in the trim board 20C such as the upper board 21C.

In this embodiment, the holder 40C is configured not to be seen from a design surface 20Ca side and to have a space where the support portions 45C are deformed to be moved to enlarge the space G.

Other Embodiments

The present technology is not limited to the description as described above with reference to the drawings. For example, the present technology may include following embodiments.

(1) In the first embodiment, the three upper holder portions 42 and the two lower holder portions 43 constitute one holding member 44. However, the holding member 44 may include at least one upper holder portion 42 and at least one lower holder portion 43. One or two or more than three upper holder portions 42 may be arranged between the two lower holder portions 43 to fix the weather strip 30 firmly.

(2) The lower holder portions may be elastically deformed when the stopper portion is inserted in the space as long as the configuration does not hinder the object of this technology.

(3) The holder may include multiple support portions some of which are defined by the slits S1 and some of which are defined by the slits S2.

The invention claimed is:

1. A door trim assembly for a vehicle comprising:
    a weather strip to be mounted on a body panel of the vehicle, the weather strip including a mount portion to be mounted on the body panel, and a stopper portion projecting from the mount portion toward a vehicular interior side;
    a door trim mounted on the weather strip, the door trim including:
        a holder plate portion arranged on the vehicular interior side with respect to the weather strip and the body panel to be opposite the weather strip and extending in a vehicular front-rear direction;
        an upper holder portion projecting from the holder plate portion toward the weather strip;
        a lower holder portion projecting from the holder plate portion toward the weather strip and having a lower holder basal portion and a lower holder distal end portion, the lower holder basal portion continuing from the holder plate portion, and the lower holder portion having a gap distance from the upper holder portion, the lower holder portion and the upper holder portion holding the stopper portion of the weather strip therebetween; and
        a support portion provided near a portion of the holder plate portion where the lower holder basal portion of the lower holder portion continues, the support portion being elastically deformable so that the lower holder portion is moved downwardly to increase the gap distance according to insertion of the stopper portion into a space formed by the gap distance.

2. The door trim assembly according to claim 1, wherein the holder plate portion includes a slit around the lower holder basal portion and the support portion is surrounded by the slit.

3. The door trim assembly according to claim 2, wherein the slit is a U-shaped slit having a bottom slit portion that is disposed below the lower holder basal portion to form the support portion on an inner side with respect to the U-shaped slit.

4. The door trim assembly according to claim 2, wherein the slit is a U-shaped slit having a bottom slit portion that is disposed above the lower holder basal portion to form the support portion on an inner side with respect to the U-shaped slit.

5. The door trim assembly according to claim 1, further comprising:
    a trim body disposed on the vehicular interior side with respect to the weather strip and the body panel, wherein
    the holder plate portion is mounted on the trim body as a separate component from the trim body.

6. The door assembly according to claim 2, wherein the lower holder portion is arranged on the support portion.

7. The door trim assembly according to claim 2, wherein the slit is a U-shaped slit having a bottom slit portion and two side slit portions,
    the support portion is surrounded by the bottom slit portion and the two side slit portions,
    the support portion includes a support basal portion and a support edge portion, and the support basal portion is near two ends of the two side slit portions and the support edge portion is along the bottom slit portion, and
    the support portion is deformable and configured to pivot about the support basal portion.

8. The door trim assembly according to claim 3, wherein the support portion includes a support basal portion and a support edge portion, and the support basal portion is near two ends of the U-shaped slit and the support edge portion is along the bottom slit portion, and
    the support portion is deformable and configured to pivot about the support basal portion so that the support edge portion moves toward a vehicular interior side.

9. The door trim assembly according to claim 4, wherein the support portion includes a support basal portion and a support edge portion, and the support basal portion is near two ends of the U-shaped slit and the support edge portion is along the bottom slit portion, and
    the support portion is deformable and configured to pivot about the support basal portion so that the support edge portion moves toward a vehicular exterior side.

10. The door trim assembly according to claim 1, wherein the lower holder portion is longer than the upper holder portion.

11. The door trim assembly according to claim 1, wherein the support portion is a part of the holder plate portion.

12. The door trim assembly according to claim 1, wherein the stopper portion has a projected end portion and is tapered to the projected end portion.

13. The door trim assembly according to claim 12, wherein
    the upper holder portion has a upper holder distal end portion and the lower holder portion has a lower holder distal end portion and the upper holder distal end portion and the lower holder distal end portion are away from each other by the gap distance,
    the stopper portion has a height between a top and a bottom thereof,
    the gap distance is smaller than the height of the stopper portion.

14. The door trim assembly according to claim 13, wherein
    the upper holder portion has a curved plate-like shape,
    the lower holder portion has a straight shape,
    the stopper portion has projections on a lower surface thereof, and the projections are elastically deformed to be in contact with the lower holder portion.

15. The door rim assembly according to claim 1, further comprising:

a trim body disposed on the vehicular interior side with respect to the weather strip and the body panel, the trim body integrally includes the holder plate portion as a unitary part.

* * * * *